United States Patent
Picard

[19]

[11] Patent Number: 6,155,458

[45] Date of Patent: Dec. 5, 2000

[54] CONTENTS EXPELLER FOR COLLAPSIBLE TUBE

[76] Inventor: Jacques Picard, 2985 La Dauversieve #402, Sherbrooke Que, Canada, J1L 1B9

[21] Appl. No.: 09/492,660

[22] Filed: Jan. 27, 2000

[51] Int. Cl.[7] .................................................... B65D 35/28
[52] U.S. Cl. ............................................................ 222/103
[58] Field of Search ................................ 222/103; 251/4, 251/7; 132/279

[56] References Cited

U.S. PATENT DOCUMENTS

| | | | |
|---|---|---|---|
| 4,159,787 | 7/1979 | Wright | 222/103 |
| 4,502,613 | 3/1985 | Yamamoto | 222/103 |
| 5,501,369 | 3/1996 | Tal . | |
| 5,782,385 | 7/1998 | Soon | 222/103 |
| 5,857,593 | 1/1999 | Patronaggio . | |

FOREIGN PATENT DOCUMENTS 2127113  9/1993  Canada .

*Primary Examiner*—Philippe Derakshani

[57] ABSTRACT

A reusable contents expeller for collapsible tube which prevents contents from reverting back into the collapsible tube and that can easily be removed and installed on another tube without the need to firstly insert it through the base of the collapsible tube. The expeller is comprised of an oblong element with two extremities, which is comprised of a place where it is thin at its thickness and across its breadth so that it is flexibly pliable to allow the oblong element to fold upon itself to the point where the two extremities join, thus forming two pressure plates. The pressure plates are further held and secured together by the use of a hinged flap contiguous and part of one of the pressure plates. The flap acts like a hook to secure both pressure plates tightly together. Once closed about a collapsible tube, the contents expeller for collapsible tube expels the contents when it is slid across the length of the tube.

4 Claims, 2 Drawing Sheets

CONTENTS EXPELLER FOR COLLAPSIBLE TUBE

BACKGROUND OF THE INVENTION

1. Field of the Invention

The present invention relates to devices used to expel or squeeze out contents out of collapsible tubes such as those used for toothpaste, cosmetics, liniments and any other types of pasty substances. Some of those devices also prevent the contents from flowing back into the tube and thus prevent waste and user aggravation.

2. Description of the Relevant Art

U.S. Pat. No. 5,782,385 by Soon, besides teaching its own patent, gives a comprehensive explanation for the recently found need for devices that help in expelling the contents of collapsible tubes. Said patent also reviews 3 design patents and 2 utility patents.

Given the rather simple nature of the device at hand, there is no need to elaborate in long sentences and paragraphs the specifics of each patent application, Soon's application did a terrific job of that. Suffice it to say that none of the prior art discussed offers the simple and convenient ability to quickly remove the device from an empty tube and putting it onto a new one.

For example, the device that Soon teaches states that a screw driver be used to separate the two portions of his tube squeezer and goes on to describe the 8 steps required to remove said tube squeezer from one tube before putting it onto another tube.

Besides the aforementioned prior art, U. S. Pat. No. 5,857,593 by Patronaggio, issued after Soon, is another variation of a device used for a similar purpose and so is U. S. Pat. No. 5,501,369 by Zeev.

Also of note is Canadian patent application number 2,127,113, by Naslund (which covers his original Swedish application number 441,261). The said patent is in a different classification and serves a different purpose but because it is similar in physical shape than the invention discussed in this application, some clarification need to be done:

It should be noted that Naslund goes into great lengths to describe his invention as being "particularly a bag clip" to close up bags and stop the contents from coming out whereas this present invention entitled "contents expeller for collapsible tube" is aimed at aiding contents to be expelled, not from bags but from tubes such as those used for paste, cream, ointments and such. Although at first glance the two inventions appear physically similar, they are taken from a different class and provide substantially different functions in substantially different ways.

That is why Naslund, in his Canadian patent 2,127,113 on page 3 lines 14–15 doesn't teach a pair of pressure plates but rather "an outwardly extending bridge 6 which is spaced from the bottom of the limb, so as to define a space 7." This part is designed to exert great force upon the bag in order to seal it and makes it harder for it to slide along the length of a bag.

It is important in Naslund that the said bridge be "elastically resilient" as per page 3, line 26. In other words, the bridge has to be compressed from its normal slightly convex shape into a flat or even concave shape in order to fully clamp and seal a bag. (see FIG. 5 of his said patent).

Since it is the object of this present invention to allow the content expeller to slide along the length of a collapsible tube in order to aid in expelling its content, much less pressure is required. Just enough for the content expeller to keep its place and not allow contents to flow backwards into the tube.

In view of the prior art cited above, it is believed that the present invention which will be described herein offers a much simpler and efficient way of performing the same useful duty as any of the other prior art.

SUMMARY OF THE INVENTION

The principal object of the present invention is to provide a simple, reliable and economically realized apparatus which can help in expelling contents from collapsible tubes.

It is also an object of this invention to prevent said contents from said collapsible tubes from reverting back into said collapsible tubes.

It is also an object of this invention to provide a reusable expeller.

It is another object of this invention to provide an expeller that can easily be removed and installed onto another tube without the need of tools.

It is another object of this invention to provide an expeller that can be installed onto a collapsible tube at any plane along its length without the need to firstly insert it through the base of the collapsible tube.

It is yet another object of this invention to maximize the use of the contents within the collapsible tube.

It is finally an object of this invention to provide a simple collapsible tube expeller which makes it easy to evaluate the amount of contents remaining.

To attain these ends, the present invention is embodied in the form of an oblong element with two extremities. Said oblong element has a place where it is thin at its thickness and across its breadth so that said place is flexibly pliable to allow said oblong element to fold upon itself to the point where the two said extremities join, thus forming two pressure plates. Said pressure plates are further held and secured together by the use of a hinged flap contiguous and part of one of the extremities of said pressure plates and whereby said hinged flap acts like a hook when engaged into a tongue to secure both pressure plates tightly together and when wrapped about a collapsible tube aid in expelling contents of said collapsible tube when it is slid across the length of said collapsible tube.

DESCRIPTION OF THE PREFERRED EMBODIMENTS

Figure 1:
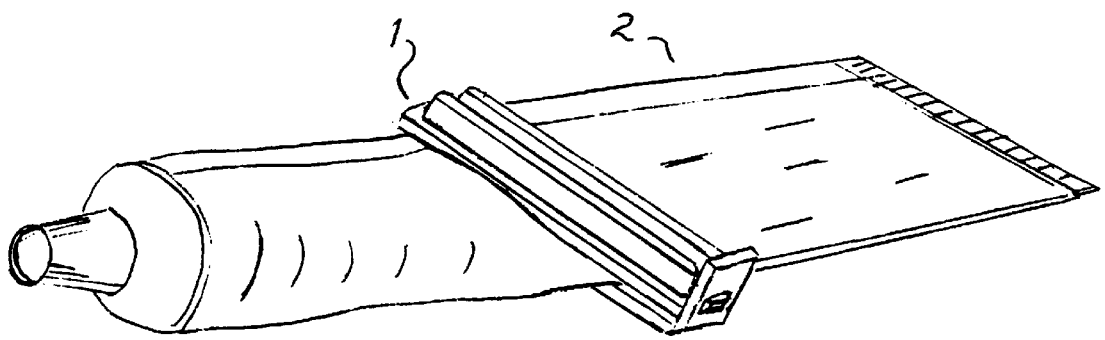
FIG. 1 Is an isometric view showing generally the contents expeller for collapsible tube in operating mode.

FIG. 1 Is an isometric view showing the contents expeller for collapsible tube 1 in operating mode as it is snugly held onto a collapsible tube 2.

Figure 2:
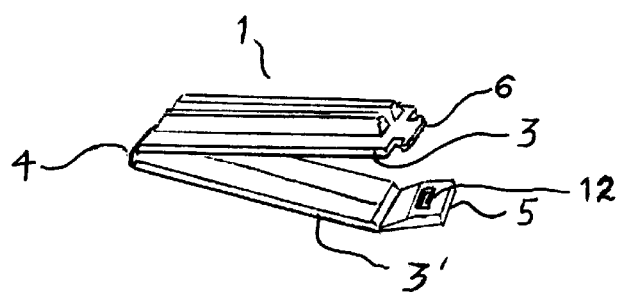
FIG. 2 Is an isometric view of the expeller semi opened.

FIG. 2 Is an isometric view of the expeller 1 semi opened. One can clearly see the two oblong elements referred to as pressure plates 3 and 3' each one being flexibly attached to the other by means of a flexible hinge 4. Said flexible hinge 4 is made of the same plastic and is integral to the rest of the expeller 1. When the expeller 1 is closed, there is a hinged flap 5 also made of the same plastic and is integral to the rest of the expeller 1 with a through hole 12 into which a tongue 6 is inserted. Said tongue 6 is also made of the same plastic and is integral to the rest of the expeller 1 . With a flick of a finger one can flip the hinged flap 5 and open the expeller 1.

Figure 3:
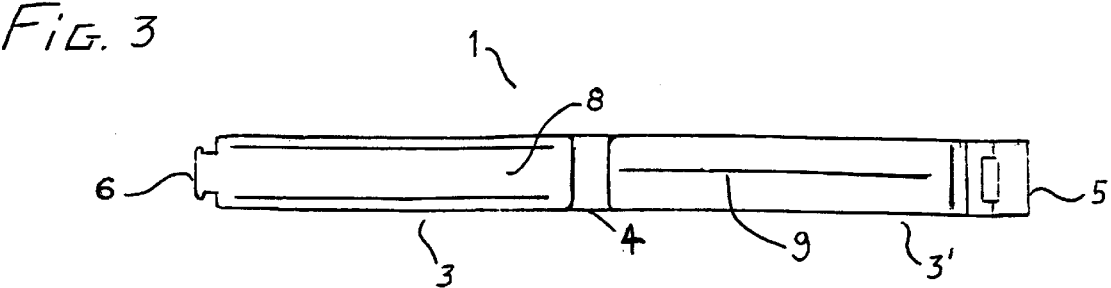
FIG. 3 Is a top view of the expeller, fully opened.

FIG. 3 Is a top view of said expeller 1 in an opened position showing the flexible hinge 4 the two pressure plates 3 and 3', the hinged flap 5 the tongue 6. A concave curve 8 and a convex curve 9 give a kink to a collapsible tube (not shown) in order to increase friction.

Figure 4:
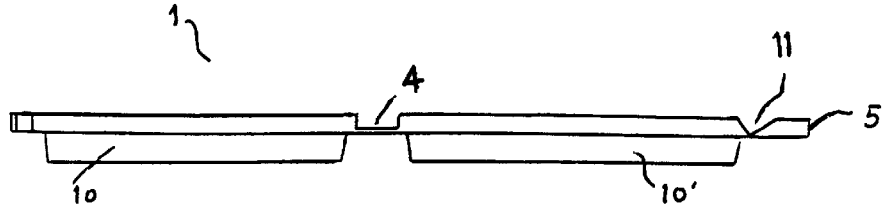
FIG. 4 Is a side view of the expeller, fully opened.

FIG. 4 Is a side view of the expeller 1 opened showing how the flexible hinge 4 works by virtue of its thinness. Also, the thickness of the ribs 10 and 10' that provide the necessary stiffness to the expeller 1. The hinged flap 5 also works by having a thin segment 11 between said hinged flap 5 and one of the said pressure plate 3'.

Figure 5:
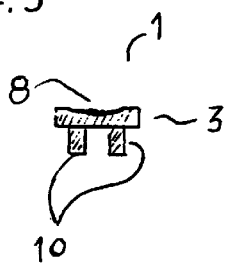
FIG. 5 Is a cut across the width of the expeller.

FIG. 5 Is a cut across the width of the expeller 1 to better show the concave curve 8 and the rib 10 of a pressure plate 3.

Figure 6:
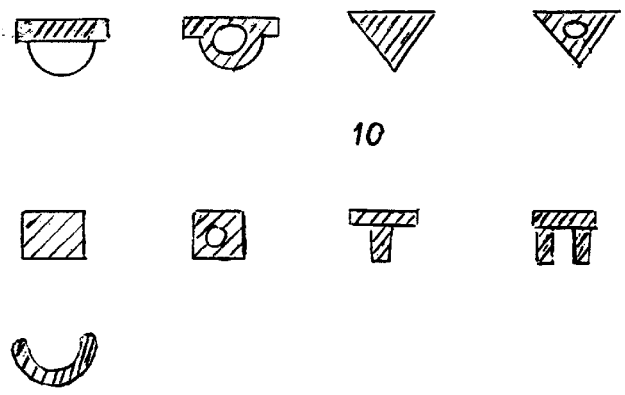
FIG. 6 Shows alternate embodiments of the ribs of the expeller.

FIG. 6 Shows alternate embodiments of the rib 10 of the expeller(not shown) that present a non exhaustive list of possible configurations of ribs 10 to indicate that the design of the expeller is not limited to that of the expeller illustrated in the other figures but that variations of the rib shape, not limited to those presented here, could perform the same duty and therefore be covered in the claims set forth in this application.

What is claimed:

1. A reusable contents expeller for collapsible tube which prevents said contents from reverting back into said collapsible tube and that can easily be removed and installed on another tube without the need to firstly insert it through the base of the collapsible tube, said expeller is comprised of an oblong element with two extremities at each ends of its length with said oblong element having a place where it is thin at its thickness so that said place is flexibly pliable to allow said oblong element to fold upon itself to the point where the two said extremities join, thus forming two pressure plates and said pressure plates are further held and secured together by the use of a hinged flap contiguous and part of one of the extremities of said pressure plates whereby said flap acts like a hook to secure both pressure plates tightly together and when wrapped onto a collapsible tube aid in expelling contents of said collapsible tube.

2. A contents expeller for collapsible tube as described in claim 1 has a concave curve and a convex curve to kink a collapsible tube in order to increase friction.

3. A contents expeller for collapsible tube as described in claim 1 has a hinged flap which hooks into a tongue.

4. A contents expeller for collapsible tube as described in claim 1 has one rib on each pressure plate to provide stiffness to said contents expeller for collapsible tube.

\* \* \* \* \*